J. CLARK.
Sewer-Trap.

No. 207,644.  Patented Sept. 3, 1878.

WITNESSES:
C. Neveux
C. Sedgwick

INVENTOR:
J. Clark
BY Munn & Co
ATTORNEYS.

UNITED STATES PATENT OFFICE.

JOSEPH CLARK, OF BROOKLYN, NEW YORK.

IMPROVEMENT IN SEWER-TRAPS.

Specification forming part of Letters Patent No. 207,644, dated September 3, 1878; application filed August 6, 1878.

*To all whom it may concern:*

Figure 1:
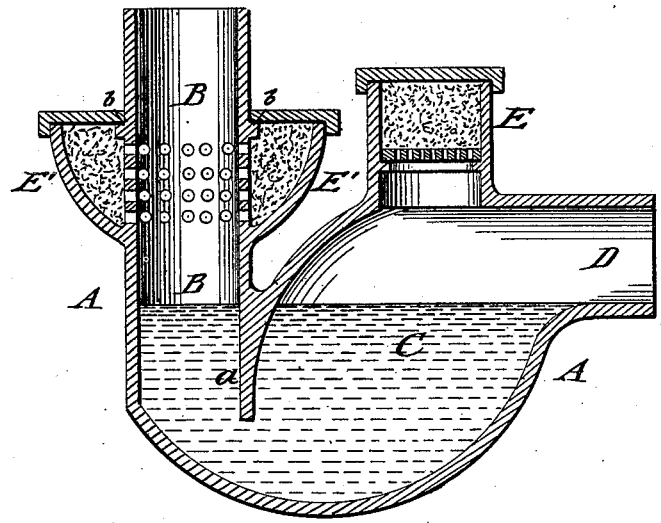
Figure 2:
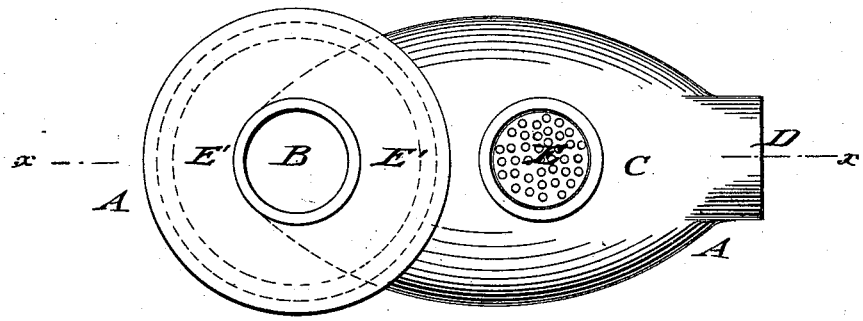

Be it known that I, JOSEPH CLARK, of Brooklyn, county of Kings, State of New York, have invented a new and Improved Sewer-Trap, of which the following is a specification:

In the accompanying drawing, Figure 1 represents a vertical longitudinal section of my improved sewer-trap; Fig. 2, a top over the same.

Similar letters of reference indicate corresponding parts.

This invention relates to an improved sewer-trap of such construction that the siphoning of the trap is prevented and the choking up of the same obviated, and the stench of the gases arising from the sewer neutralized to a certain extent.

The invention will first be described in connection with the drawing, and then pointed out in the claims.

Referring to the drawing, A represents a sewer-trap of cast-iron, vitrified clay, or other suitable material.

The sewer-trap is made of a vertical inlet-pipe, B, and of an enlarged bulging-out portion, C, that forms the connection between the mouth of the inlet-pipe and its separating-wall $a$ and the outlet-pipe D at the upper part of the bulging portion. The level of the water in the trap furnishes a hydraulic seal, in which a large quantity of water is collected in the bulging part C, which, though it be lowered to some extent by suction and siphoned off, will still leave a sufficient quantity of water to the opening below the partition $a$, and thereby keep the trap seated. The force of the suction will not be strong enough for drawing off all the water, so that the sewer-gases cannot escape into the pipe.

On the top of the bulging portion C is arranged a chamber or receptacle, E, with perforated bottom and luted top, which chamber is filled with chloride of lime or other disinfectant for neutralizing the sewer-gases in the trap. The chloride of lime is replaced from time to time, and the cover resealed by clay or other luting.

A second chamber, E', is formed around the inlet-pipe A by an annular flange and a cover that is seated on an annular shoulder, $b$, of the pipe A and on the flange, and hermetically sealed thereto.

That portion of the inlet-pipe within the chamber E' is perforated, so that the water can enter into the same in case the trap is choked by sediments or other obstructions.

The chamber is filled with potash or any other disintegrating compound, which is dissolved when the water rises by the choking of the trap, so as to attack the obstructing substances, destroy them, and restore automatically the effective working of the trap.

The bottom of the disinfectant-chamber has to be arranged somewhat above the main part of the chamber D, so that the water, in rising, can only dissolve the disintegrating compound, but not the disinfectant. The lowermost holes of the inlet-pipe have to be on a level with the bottom of the annular chamber E, so as to draw off any water that may pass through the upper holes into the chamber E without giving it time to exert any dissolving influence on the potash therein. The sewer-trap combines thus a superior working with means for neutralizing the sewer-gases and disinfecting the trap, and with means for removing automatically obstructions that would otherwise choke the trap and cause trouble and expense. The bulging portion of the trap may, however, be readily cleaned by taking off the cover and removing the perforated bottom of the disinfectant-chamber.

Having thus described my invention, I claim as new and desire to secure by Letters Patent—

1. A sewer-trap having a disinfectant-chamber with perforated bottom and sealed cover above the bulging portion of the trap, substantially as described.

2. A sewer-trap provided with an annular chamber and sealed cover for a disintegrating compound around the inlet-pipe, said pipe having holes communicating with the chamber, substantially as described.

3. A sewer-trap provided with a chamber for disinfecting material above the bulging portion of the trap and with an annular chamber for a disintegrating compound around the inlet-pipe, the latter chamber being somewhat below the former chamber, substantially as described.

JOSEPH CLARK.

Witnesses:
PAUL GOEPEL,
JAMES H. HUNTER.